United States Patent
Kanzaki et al.

(10) Patent No.: US 9,933,626 B2
(45) Date of Patent: Apr. 3, 2018

(54) STEREOSCOPIC IMAGE

(71) Applicant: INTERNATIONAL BUSINESS MACHINES CORPORATION, Armonk, NY (US)

(72) Inventors: Eisuke Kanzaki, Fujisawa (JP); Yasumoto Nakayama, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/834,698

(22) Filed: Aug. 25, 2015

(65) Prior Publication Data
US 2016/0054572 A1 Feb. 25, 2016

Related U.S. Application Data

(62) Division of application No. 13/269,800, filed on Oct. 10, 2011, now abandoned.

(30) Foreign Application Priority Data

Nov. 19, 2010 (JP) .................................. 2010258920

(51) Int. Cl.
*G06K 9/00* (2006.01)
*G02B 27/22* (2018.01)
(Continued)

(52) U.S. Cl.
CPC ......... *G02B 27/2214* (2013.01); *G06K 9/209* (2013.01); *H04N 13/0011* (2013.01); *H04N 13/0404* (2013.01)

(58) Field of Classification Search
CPC .................... G02B 27/2214; H04N 13/0431
(Continued)

(56) References Cited

U.S. PATENT DOCUMENTS 3,960,563 A 6/1976 Lo et al.
4,650,282 A * 3/1987 Lo ...................... G02B 27/2214
352/58

(Continued)

FOREIGN PATENT DOCUMENTS

CN 1081768 A 2/1994
CN 1580947 A 2/2005
(Continued)

OTHER PUBLICATIONS

Fujifilm 3D, [online]; [retrieved on Jul. 27, 2011]; retrieved from the Internethttp://fujifilm.jp/personal/3d/print/3dprint/index.html; pp. 1-2.

*Primary Examiner* — Audrey Y Chang
(74) *Attorney, Agent, or Firm* — Cantor Colburn LLP; Anthony England (57) ABSTRACT

A method of generating an image to be observed as a stereoscopic image when viewed binocularly through an eye-side surface of a lenticular lens, in which a plurality of parallax images are arranged on a back surface of each of lenses of the lenticular lens or light beams corresponding to the plurality of images are input to the back surface, the method including parallax per unit length is made relatively smaller, in at least part, at a position closer to each edge of each lens in a direction orthogonal to a longitudinal direction of the lens.

1 Claim, 7 Drawing Sheets (51) Int. Cl.
*G06K 9/20* (2006.01)
*H04N 13/04* (2006.01)
*H04N 13/00* (2018.01)

(58) Field of Classification Search
USPC .............................. 359/463; 348/59; 382/154
See application file for complete search history.

(56) References Cited

U.S. PATENT DOCUMENTS

| | | | |
|---|---|---|---|
| 4,852,972 A * | 8/1989 | Wah Lo | G03B 35/00 355/22 |
| 5,192,969 A | 3/1993 | Igarashi et al. | |
| 5,543,964 A | 8/1996 | Taylor et al. | |
| 5,815,314 A * | 9/1998 | Sudo | G02B 27/2285 345/31 |
| 5,838,494 A | 11/1998 | Araki | |
| 6,519,358 B1 * | 2/2003 | Yokoyama | G06K 9/209 348/E13.014 |
| 7,643,552 B2 * | 1/2010 | Saishu | H04N 13/0011 348/59 |
| 8,558,874 B2 | 10/2013 | Watanabe | |
| 2008/0279449 A1 * | 11/2008 | Ramstad | H04N 13/0431 382/154 |

FOREIGN PATENT DOCUMENTS

| | | |
|---|---|---|
| CN | 1643939 A | 7/2005 |
| CN | 1703099 A | 11/2005 |
| EP | 0583766 A1 | 2/1994 |
| JP | 06209400 | 7/1994 |
| JP | H06342190 A | 12/1994 |
| JP | H0749466 A | 2/1995 |
| JP | 09189883 | 7/1997 |
| JP | 10336706 | 12/1998 |
| JP | H10319345 A | 12/1998 |
| JP | 2953433 B2 | 9/1999 |
| JP | 2005142957 A | 6/2005 |
| JP | 2006154800 A | 6/2006 |
| JP | 2006319819 A | 11/2006 |
| JP | 2009058889 | 3/2009 |
| JP | 2009509177 A | 3/2009 |
| JP | 2009239389 | 10/2009 |
| WO | WO2010084849 A1 | 7/2010 |

* cited by examiner

FIG. 7

STEREOSCOPIC IMAGE

DOMESTIC PRIORITY

This application is a divisional of the legally related U.S. application Ser. No. 13/269,800 filed Oct. 10, 2011, which claims priority to Japanese Patent Application No. 2010-258920, filed Nov. 19, 2010, and all the benefits accruing therefrom under 35 U.S.C. §119, the contents of which in its entirety are fully incorporated by reference.

BACKGROUND

A lenticular lens is a plate-like (sheet-like) lens including a side-by-side array of long and narrow semicylindrical lenses. When multiple different images are arranged on a back surface of each of the lenses (each of the semicylinders), while each extending in a strip form in a longitudinal direction of the lens, different images are viewed depending on the angle from which the images are observed. Making use of this feature, if images of an object taken from different angles are arranged in the above-described manner, a person can see different images having a parallax with his/her right and left eyes, respectively. In this way, a stereoscopic image can be generated which a person can enjoy viewing with the naked eyes without using any stereopticon or the like.

BRIEF SUMMARY

According to one embodiment of the present invention, a method of generating an image to be observed as a stereoscopic image when viewed binocularly through an eye-side surface of a lenticular lens, in which a plurality of parallax images are arranged on a back surface of each of lenses of the lenticular lens or light beams corresponding to the plurality of images are input to the back surface, the method including parallax per unit length is made relatively smaller, in at least part, at a position closer to each edge of each lens in a direction orthogonal to a longitudinal direction of the lens.

According to another embodiment of the present invention, an apparatus for generating a stereoscopic image, the apparatus including a lenticular lens, and a plurality of parallax images which are arranged on a back surface of each of lenses of the lenticular lens and are observed as a stereoscopic image when viewed binocularly through an eye-side surface of the lens, the parallax images having relatively smaller parallax per unit length, in at least part, at a position closer to each edge of each lens in a direction orthogonal to a longitudinal direction of the lens.

According to yet another embodiment of the present invention, an apparatus for generating a stereoscopic image, the apparatus includes a lenticular lens, a means for obtaining interpolation images from two parallax images through interpolation between the two images in such a manner that parallax of adjacent images thereof is made larger at a position closer to the center of each lens, and a means for arranging or inputting the two images and the interpolation images in or to areas on a back surface of each lens of the lenticular lens, respectively, the areas each having the same width in a direction orthogonal to a longitudinal direction of the lens.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

DETAILED DESCRIPTION

Figure 4:
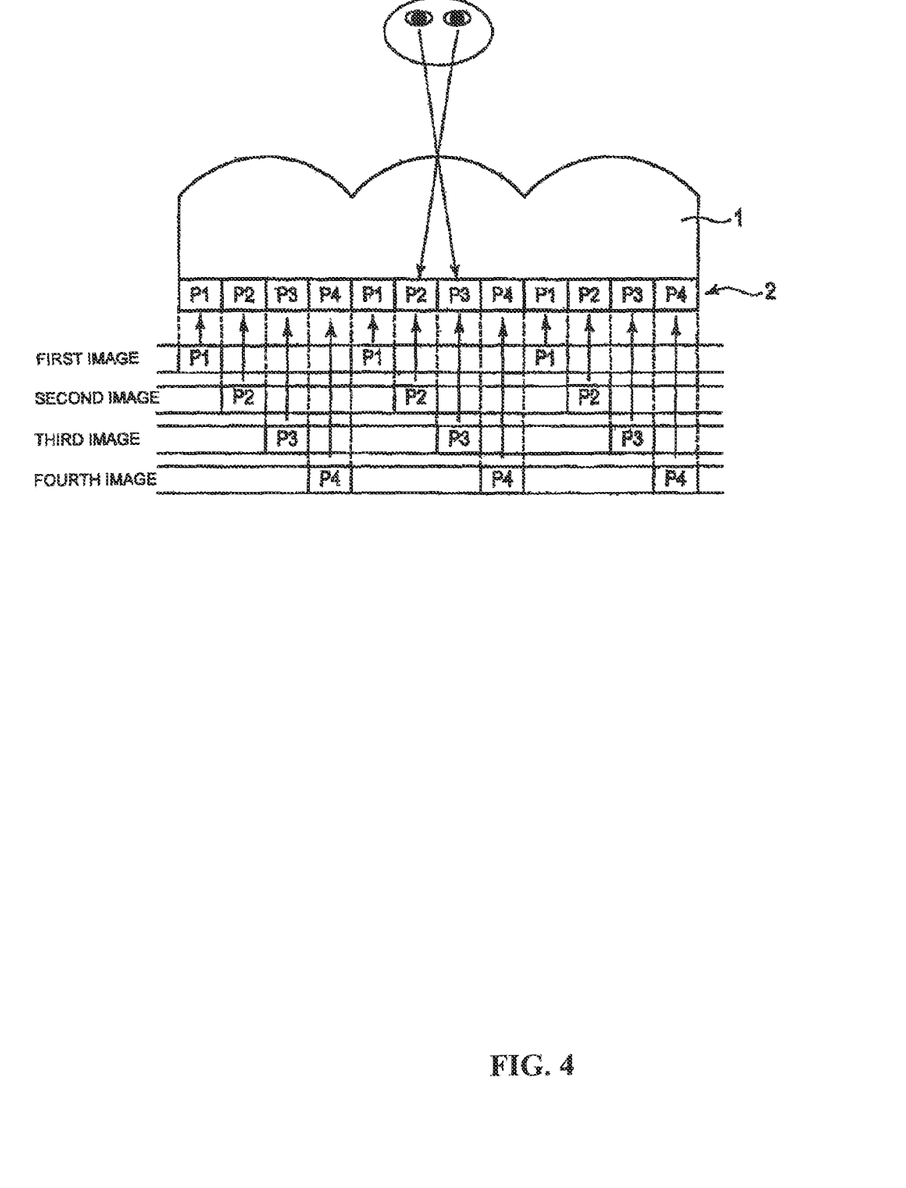
FIG. 4 is a schematic view showing a relation of a lenticular lens and images arranged on a back side of the lenticular lens.

FIG. 4 is a schematic diagram showing a relation between a lenticular lens and images arranged on the back side of the lenticular lens, to explain a general method of generating a stereoscopic image by use of the lenticular lens. FIG. 4 shows a case of using four images taken respectively from different angles. Each semicylindrical lens has equally-divided images (P1, P2, P3 and P4) arranged on its back surface sequentially. When the images on the back surface of the lens are observed from the front side of the lens, the images are magnified by the lens several times only in an orthogonal direction to the longitudinal direction of the lens. Accordingly, an observer can see only one of the multiple images arranged on the lens (P1, P2, P3 and P4), and the image which the observer can see depends on the angle of his/her visual axis with respect to the lens. When observing the images from the front side of the lenticular lens, the observer can see different images respectively with his/her left and right eyes since the visual axes of the left and right eyes have different angles with respect to the lens. Accordingly, the parallax of the two images can give the observer a sense of depth.

Figure 5:
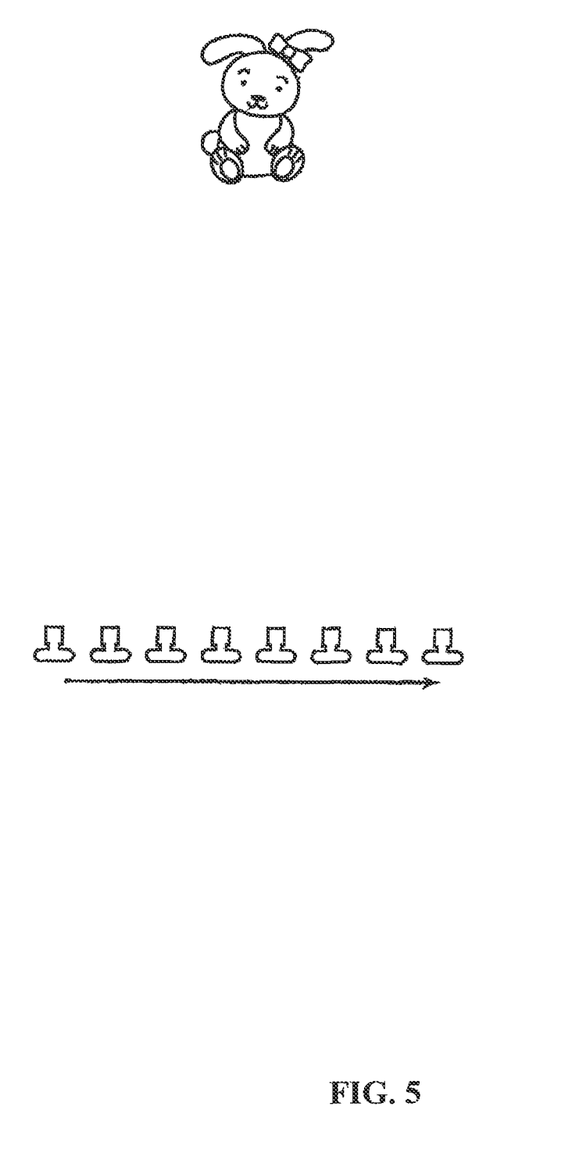
FIG. 5 is a view for explaining a method of obtaining parallax images.

To generate a stereoscopic image by using a lenticular lens, multiple images of an object taken from different angles are used as described above. When the object is a still object such as a doll, a single camera is moved little by little (this movement can be performed by using a computerized movable camera mount or the like), and an image of the object is taken every time the camera is moved, to obtain the multiple images (see FIG. 5). However, when the object is a moving object or person, it is necessary to use multiple cameras (or lenses) and to release the shutters of the cameras simultaneously.

Figure 6A:
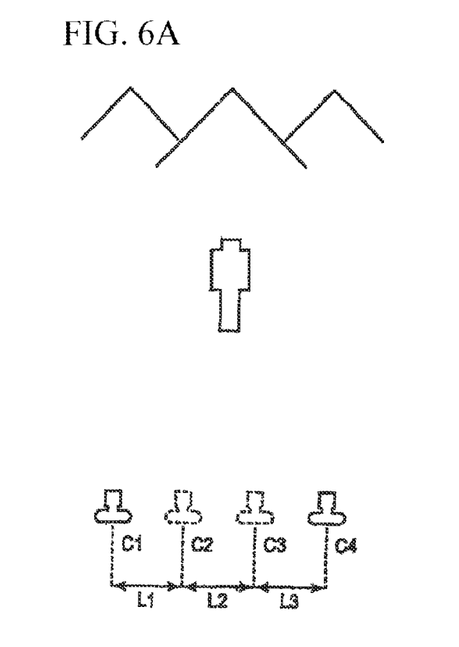
FIGS. 6A and 6B are views for explaining a method of generating a stereoscopic image which is made smooth by being interpolated with parallax images.
Figure 6B:
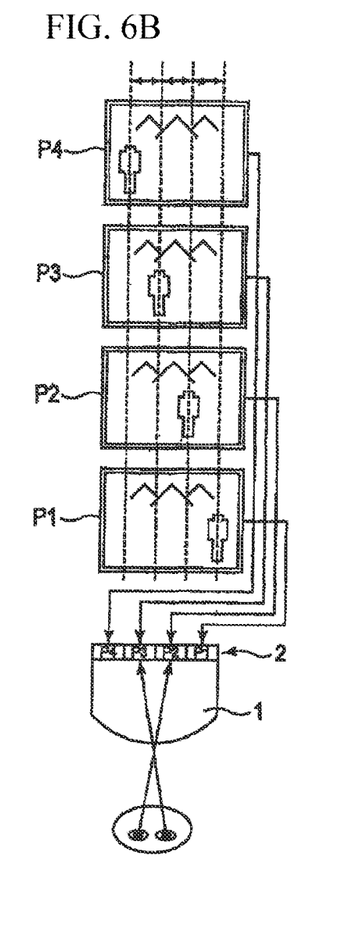

Alternatively, as shown in FIGS. 6A and 6B, it is also possible to take two images respectively by two cameras (or lenses), and to then create, by using the two actually-taken images, images which are interpolated between the two actually-taken images.

FIG. 6A is a view showing a photographing scene. In this shooting, images of a person with a background of infinitely distant mountains are simultaneously taken by multiple cameras, respectively (simultaneous shooting can be performed under computer control or the like), to obtain parallax images. The point here is that actual image shooting is performed only from positions of a first camera C1 and a fourth camera C4. The person is on a right side in a first image P1 captured by the first camera C1 while being on a left side in a fourth image P4 captured by the fourth camera C4.

Then, on the basis of the first image P1 captured by the first camera C1 and the fourth image P4 captured by the fourth camera C4, two images (a second image P2 and a third image P3) are generated so as to be equally interpolated between the first and fourth images P1 and P4. The images P2 and P3 are images that can be captured by a virtual second camera C2 and third camera C3, which are imaginarily placed respectively at positions dividing the distance between the first camera C1 and the fourth camera C4 equally into three (L1=L2=L3).

In this case, the images interpolated between the actually-taken ones are simulated images and hence do not accurately reproduce images which can be captured at the intermediate positions. Nevertheless, when having a simple overlapping state of objects, the interpolation images have a sufficient effect on producing a sense of depth.

Meanwhile, in the case of creating a stereoscopic image of an object modeled in a virtual space by using a computer graphics (CG) technique, shooting (creation of the stereoscopic image) can be performed by placing a necessary number of virtual cameras (lenses) at necessary positions.

To produce a stereoscopic image by using a lenticular lens for a commercial purpose, it is usual to employ multiple cameras or a method of shooting images while moving, as described above. In contrast, there are some products which enable even consumer-level cameras to produce stereoscopic images.

For example, Nimslo 3D released by Nimstec in 1980 simultaneously takes four parallax images by using four lenses lined in a row. When a user sends a film exposed by Nimtec 3D to a laboratory, the film is developed, and stereoscopic images taken by using the lenticular lens are returned. Additionally, Finepix (registered trademark) Real 3D released by Fujifilm Corporation in 2009 can simultaneously take two images by using two lenses. When a user sends the data of the images taken by this camera to a laboratory, images processed by means of the above-described interpolation technique are returned (Internet <URL: http://fujifilm.jp/personal/3d/print/3dprint/index.html>).

It should be noted that, although two images are used for interpolation in the example in FIGS. 6A and 6B, the number of images to be used for interpolation is not limited to this, and a larger number of images may be used as described in Japanese Patent Application Publication No. 2009-239389.

In general, in seeing different images respectively with right and left eyes, a person gains a larger sense of depth as the parallax of the images is larger. The parallax of the images is larger as the distance (stereo base) between two cameras (or lenses) taking the images is larger, which brings a larger sense of depth to the person seeing the images.

Figure 7:
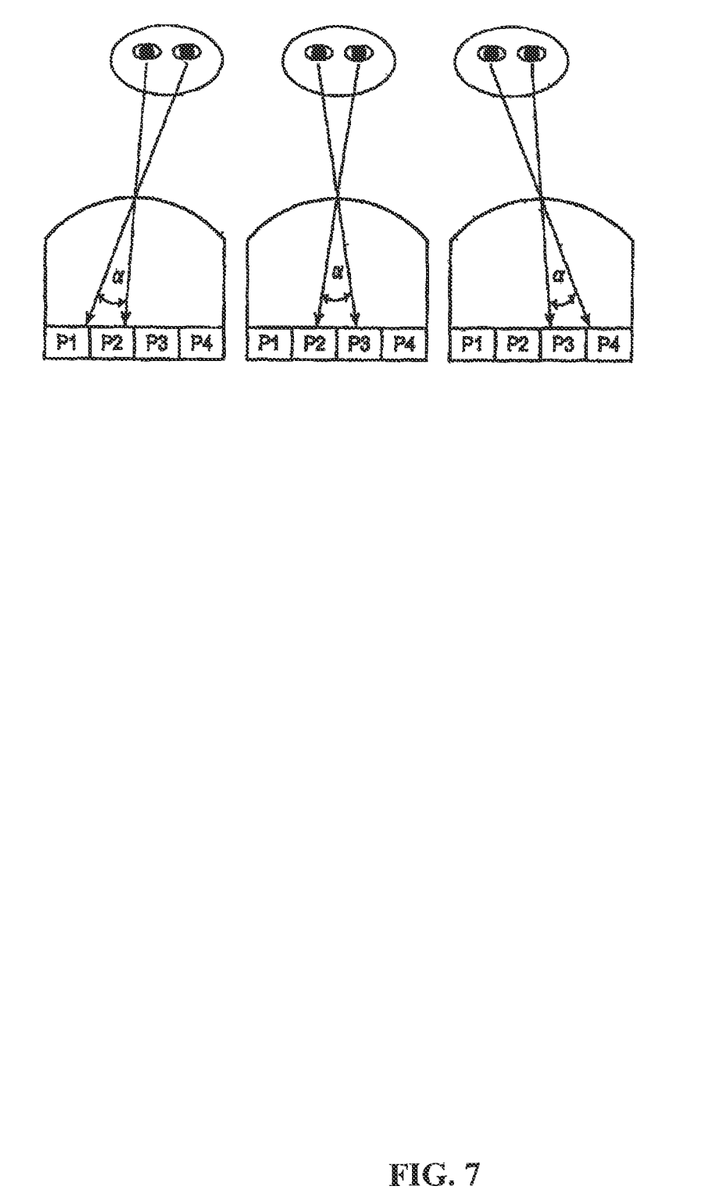
FIG. 7 is a view for explaining that a person can only see adjacent images when viewed binocularly.

However, the above-described consumer-level cameras cannot be so large in size in consideration of portability and the like, and hence do not have such a large stereo base. For example, in the case of Nimslo, the distance between two adjacent lenses is approximately 1.8 cm. The optimal positioning (distance between the lens and the eyes of the user) in observing a stereoscopic image through a lenticular lens is determined depending on the performance of the lenticular lens. According to this feature and the fact that the distance between the two eyes of a person is approximately 6 to 7 cm, the angle between the visual axes of the right and left eyes through the lens ($\alpha$ in FIG. 7) is approximately uniform. As a consequence, when observing, through a lenticular lens, a stereoscopic image created from four original images, the person can only see a pair of two adjacent images even by shifting his/her face to the right or left in order to change the angle of seeing the images (FIG. 7).

Here, in order to produce a larger sense of depth, the following two methods can be considered. The first method is to make the stereo base larger, and the second method is to increase the angle $\alpha$ by improving the performance of the lens to enable the person to see a pair of images which are not adjacent to each other (e.g. the first image and the third image).

To increase the stereo base, the camera itself needs to be larger. As to the improvement of performance of the lens, a method disclosed in Japanese Patent Application Publication No. 9-189883, for example, has been proposed.

It should be noted that, in the case of the interpolation described in Japanese Patent Application Publication No. 2009-239389 or in FIGS. 6A and 6B, a larger number of interpolation images makes possible to generate a smoother stereoscopic image while causing the stereo base between each two adjacent images to be shorter. Accordingly, simply increasing the number of interpolation images to narrow the area per image enables a person to see a pair of images which are not adjacent to each other, but changes the stereo base very little.

Figure 1:
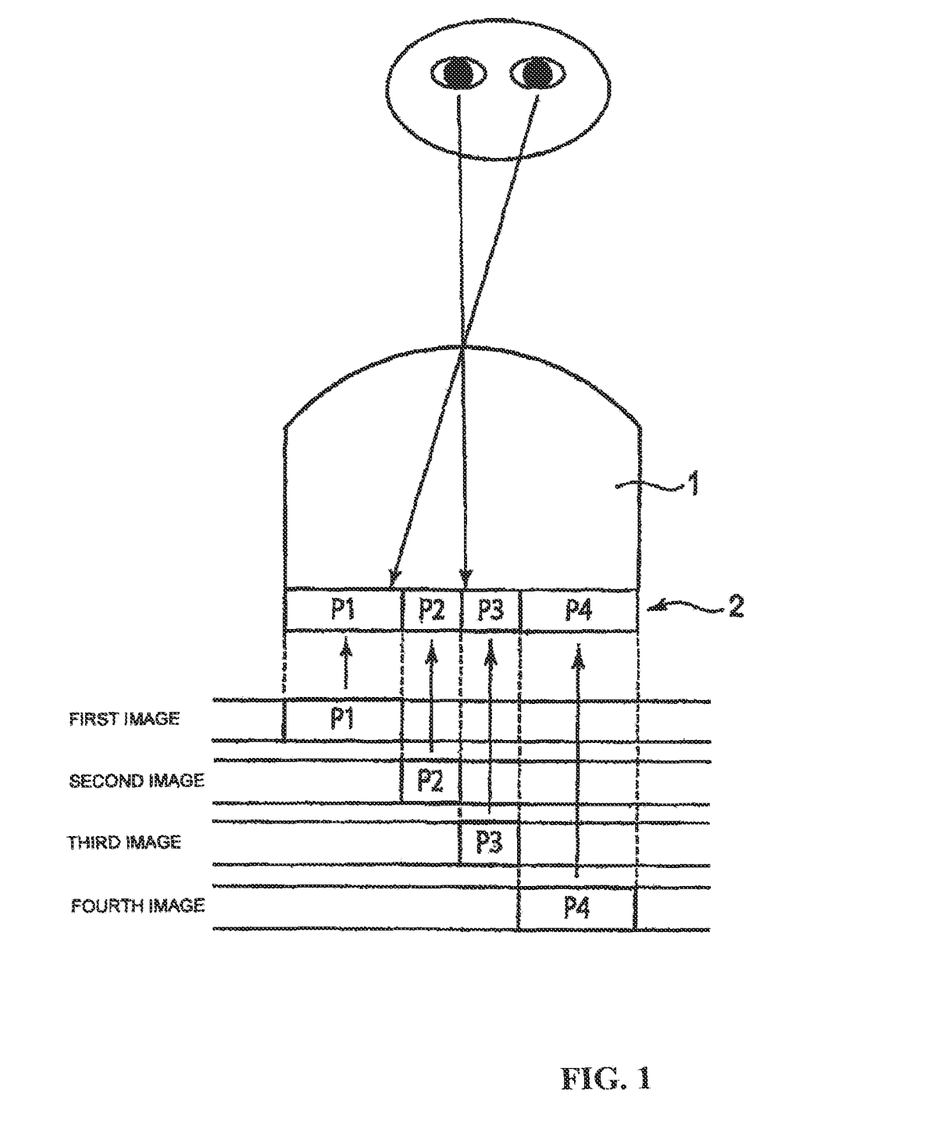
FIG. 1 is a view for explaining a method of generating a stereoscopic image according to a first embodiment of the present invention.

FIG. 1 is a view for explaining a method of generating a stereoscopic image according to a first embodiment of the present invention. This embodiment will be described on the basis of a case of using four parallax images as in the example for explaining the background art. In the case of using four parallax images in a conventional technique, a surface of each lens to which the images are attached is equally divided into four areas, and the images are assigned to the four areas, respectively. In the present invention, however, the width occupancy of a parallax image is larger at a position closer to each of edges of each lens, while being smaller at a position closer to the center of the lens. This step of attaching images to each lens can be performed automatically as a step of a computerized automatic process.

In the case in FIG. 1, the area of each of a first image P1 and a fourth image P4 is increased to approximately 1.33 times, and the area of each of a second image P2 and a third image P3 is reduced to approximately 0.67 times, in contrast to a case where the images have the equal area occupancy. As a result, the width occupancy of each of the first image P1 and the fourth image P4 is made twice as large as that of each of the second image P2 and the third image P3.

With this configuration, since the width of each area near the central portion of the lens is smaller, a pair of images having another image therebetween (the first image P1 and the third image P3, or the second image P2 and the fourth image P4, in FIG. 1), instead of a pair of adjacent images, can bee seen if a person looks at around the center of the lens at a proper angle. Consequently, the parallax of the images viewed binocularly is twice as large as that in the case of seeing adjacent images. Hence, this makes it possible to generate an image with a large sense of depth when a person looks at the sub-images from around the front of the lens, from the same number of images taken with the same stereo base by using the same lens (having the same lens performance), compared with a case in which the images having the same area occupancy with each other are used and each two adjacent images have the same parallax with each other.

Figure 2A:
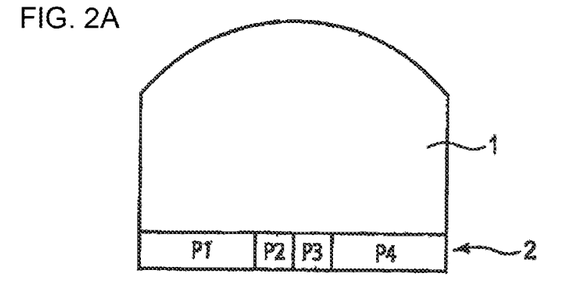
FIGS. 2A to 2C are views for explaining modifications of the method of generating a stereoscopic image according to the first embodiment of the present invention.
Figure 2B:
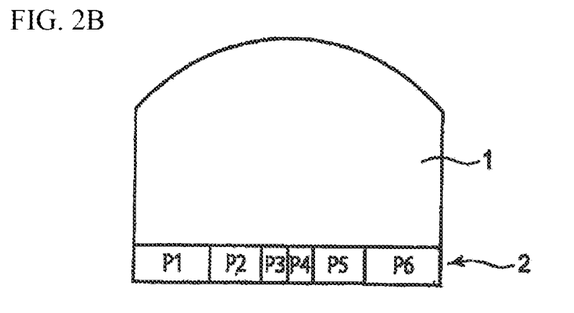
Figure 2C:
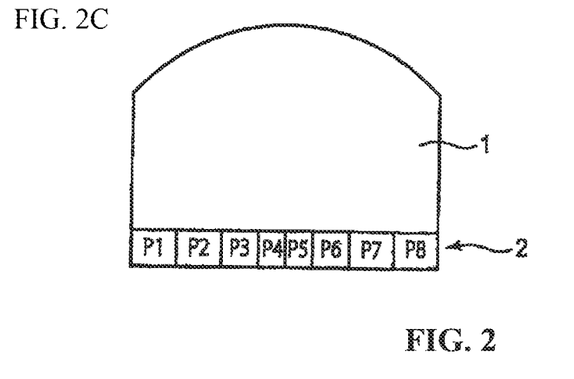

FIGS. 2A to 2C are views for explaining modifications of the method of generating a stereoscopic image according to the first embodiment of the present invention. In the example in FIG. 1, the width occupancy of each of the first image P1 and the fourth image P4 is set to be twice as large as that of each of the second image P2 and the third image P3. FIG. 2A, by contrast, shows a case in which the width occupancy of each of a first image P1 and a fourth image P4 is set to be third times as large as that of each of a second image P2 and a third image P3. In other words, the area of each of the first image P1 and the fourth image P4 is increased to approximately 1.5 times, while the area of each of the second image P2 and the third image P3 is reduced to approximately 0.5 times, of that in a case where the images have the equal area occupancy.

Naturally, the number of original images is not limited to four, either. FIG. 2B shows a case in which, among six images, the area of each of a first image P1 and a sixth image P6 is made larger while the area of each of a third image P3 and a fourth image P4 is made smaller. In any case, what is only needed is to set the width occupancy to be larger at a position closer to each of edges of each lens.

It is not necessary, however, to change the width occupancy for each of all pairs of adjacent images from edge to edge. In other words, it is not necessary to change the parallax for each of all the pairs from edge to edge. FIG. 2C shows such an example. Specifically, the width occupancy of each of a third image P3 and a sixth image P6 is made larger than that of each of a fourth image P4 and a fifth image P5 and the width occupancy of each of a second image P2 and a seventh image P7 is made larger than that of each of the third image P3 and the sixth image P6, while the width occupancy of each of a first image P1 and an eighth image P8 is made the same as that of each of the second image P2 and the seventh image P7.

Figure 3A:
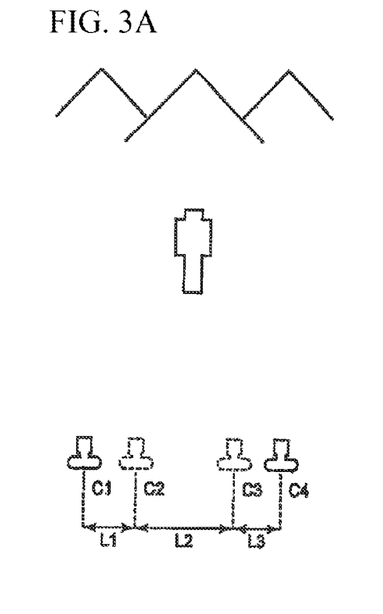
FIGS. 3A and 3B are views for explaining a method of generating a stereoscopic image according to a second embodiment of the present invention.
Figure 3B:
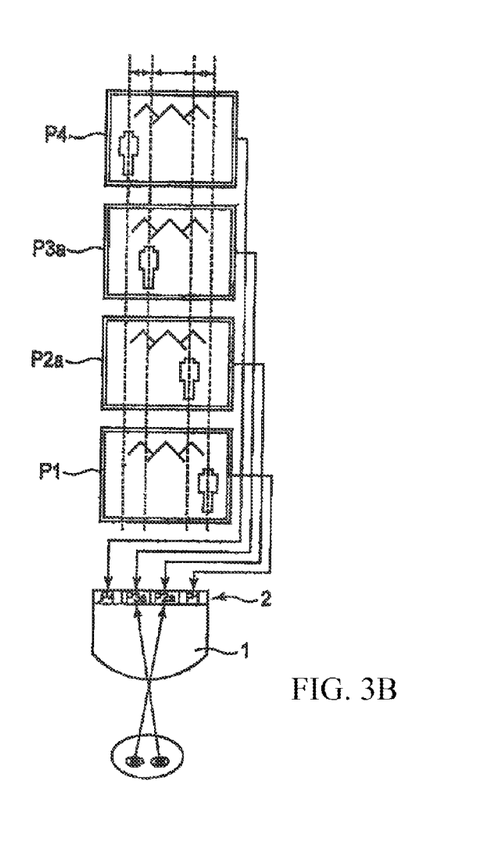

FIGS. 3A and 3B are views for explaining a method of generating a stereoscopic image according to a second embodiment of the present invention. This embodiment is on the assumption of a method of forming a stereoscopic image by interpolating parallax images as shown in FIGS. 6A and 6B.

In FIGS. 6A and 6B, the intermediate images P2 and P3 are generated by interpolation as if the cameras (lenses) were arranged with equally-spaced intervals. In the second embodiment of the present invention, however, intermediate images P2a and P3a are generated by interpolation as if a first to fourth cameras C1 to C4 were arranged in such a manner that the interval between the second camera C2 and the third camera C3 was larger than that between the first camera C1 and the second camera C2 or between the third camera C3 and the fourth camera C4 (L1=L3<L2).

To put it more simply, the interval for interpolation is set to be larger at a central portion while being set to be smaller at each peripheral portion.

The original images, i.e. the first image P1 and the fourth image P4, and the second image (intermediate image) P2a and the third image (intermediate image) P3a, thus generated, are assigned respectively to four equally-divided areas on a back surface of a lenticular lens 1. This assignment can be performed by supplying electric signals under the control of a control unit (an IC chip or the like) in a case as shown in FIGS. 3A and 3B, for example.

With this configuration, when looking at the images from around the front of the lens, the person sees the second image P2a and the third image P3a, having a large parallax, binocularly. This makes it possible to generate an image with a larger sense of depth when the person looks at sub-images from around the front of the lens, from the sub-images taken with the same stereo base by using the same lenticular lens (having the same lens performance). Consequently, in this embodiment, an image which can be seen as that formed by means of the method according to the first embodiment can be formed.

It should be noted that this embodiment also includes variations as the first embodiment does, and the number of images to be generated by interpolation on the basis of two images can be larger than two.

While the first embodiment and the second embodiment have been described above, the concept in common between the two embodiments is that parallax per unit length is made relatively smaller, in at least part, at a position closer to each edge of each lens in a direction orthogonal to a longitudinal direction of the lens. The step of making the parallax smaller can be performed in a computerized automatic process in the case of the first embodiment, and can be performed under an electric control in the case of the second embodiment, as described above. In short, this step can be performed under an automatic control by a computer in any case.

It should be noted that the present invention is effective not only in the case of using an image obtained by lenticular printing but also in the case of displaying a three-dimensional image by attaching a lenticular lens on a screen of a television, a personal computer display, a mobile phone, an e-book reader or a portable game device.

What is claimed is:

1. A method of generating an image to be observed as a stereoscopic image when viewed binocularly through an eye-side surface of a lenticular lens, in which a plurality of parallax images are arranged on a back surface of each of lenses of the lenticular lens or light beams corresponding to the plurality of images are input to the back surface, the method being characterized in that:
the plurality of parallax images include two parallax images and images obtained through interpolation between the two parallax images, wherein the interpolation causes parallax of adjacent images to be made larger at a position closer to the center of each lens; and
the images are arranged in or inputted to areas on a back surface of each lens, respectively, the areas each having the same width in a direction orthogonal to a longitudinal direction of the lens.

* * * * *

UNITED STATES PATENT AND TRADEMARK OFFICE
CERTIFICATE OF CORRECTION

PATENT NO. : 9,933,626 B2
APPLICATION NO. : 14/834698
DATED : April 3, 2018
INVENTOR(S) : Eisuke Kanzaki and Yasutomo Nakayama It is certified that error appears in the above-identified patent and that said Letters Patent is hereby corrected as shown below:

On the Title Page

Column 1, item (72) Inventors: should read as follows:
Eisuke Kanzaki, Fujisawa (JP);
Yasutomo Nakayama, Tokyo (JP)

Signed and Sealed this
Sixteenth Day of May, 2023

Katherine Kelly Vidal
*Director of the United States Patent and Trademark Office*